Patented Jan. 15, 1952

2,582,857

UNITED STATES PATENT OFFICE 2,582,857

FUNGICIDAL PREPARATION

Lester A. Brooks, Norwalk, Conn., assignor to R. T. Vanderbilt Co., Inc., New York, N. Y., a corporation of New York No Drawing. Application February 27, 1950, Serial No. 146,623

2 Claims. (Cl. 260—306.6)

This invention relates to a composition of matter which possesses utility as a fungicide.

Certain amine salts of 2-mercaptobenzothiazole are excellent fungicides. Among such salts are those derived from, for example, monoethanolamine, diethylamine, butylamine, and so forth. These compounds show various degrees of water solubility. It has been found, however, that the salt derived from monoethanolamine is far superior as a fungicide than those prepared from the simple, low molecular weight primary, secondary or tertiary alkyl amines.

Although the monoethanolamine salt is outstanding in its fungicidal properties, its commercial utilization is subject to the disadvantage that when the pure dry material is prepared and stored for some length of time it converts to a water-insoluble product which does not have good fungicidal properties. Also, the compound tends to dissociate, since it absorbs carbon dioxide from the air to form monoethanolamine carbonate, liberating a corresponding amount of 2-mercaptobenzothiazole. Furthermore, when an aqueous solution of the compound is prepared, such solution upon standing for one or two weeks will gradually decompose, yielding a water-insoluble product which does not possess high fungicidal activity, when compared with that of the initial material.

I have now found that if the monoethanolamine salt of 2-mercaptobenzothiazole is prepared by reacting monoethanolamine and 2-mercaptobenzothiazole in a water-miscible, non-aqueous solvent there can be prepared a solution which is stable to light and aging and which will retain all of its fungicidal activity and show no evidence of decomposition or dissociation upon storage. Consequently, the solution may be incorporated into aqueous systems when needed and therein used very effectively, representing for the first time a practical form of a very potent fungicide. Among the solvents which can be used in preparing the solution are dioxane and compounds within the generic formula $H(OC_2H_4)_nOR$, in which R is a hydrogen atom or an alkyl radical having from 1 to 4 carbon atoms and $n$ is either 1 or 2. Mixtures of such solvents can also be employed in preparing the solution.

As an illustration of a specific procedure falling within the scope of the present invention, 0.269 pound of monoethanolamine is dissolved in 1.506 pounds of the monoethyl ether of monoethylene glycol. To this solution there is then added 0.736 pound of 2-mercaptobenzothiazole. Upon stirring, the mercaptobenzothiazole dissolves to give a clear solution of excellent stability to light and aging and which can be incorporated into aqueous systems for the purpose of preventing fungicidal growth.

Various modifications may be made in the specific procedure described to provide other embodiments which fall within the broad scope of this invention. In place of monoethyl ether of monoethylene glycol there can be substituted dioxane, monoethylene glycol, diethylene glycol, the monomethyl ether of monoethylene glycol, the monobutyl ether of monoethylene glycol, the monomethyl ether of diethylene glycol, the monobutyl ether of diethylene glycol, and so forth. Also, although stoichiometric quantities of monoethanolamine and mercaptobenzothiazole were used in the specific illustration, some excess, for example, 5, 10 or even 20 per cent, of the monoethanolamine can be employed without appreciably altering the fungicidal activity of the composition.

The relative proportions of the monoethanolamine and solvent are not critical, the object being to prepare in solution form a composition containing a relatively large amount of the monoethanolamine salt in order that such solution may be transported and otherwise handled economically. In general, therefore, the solution should be prepared so that it contains at least about 10 per cent by weight of the salt.

I claim:

1. A solution of the monoethanolamine salt of 2-mercaptobenzothiazole dissolved in at least one solvent selected from the group consisting of dioxane and compounds of the generic formula $H(OC_2H_4)_nOR$, in which R is a substituent selected from the group consisting of hydrogen and alkyl radicals having from 1 to 4 carbon atoms and in which $n$ is an integer from 1 to 4.

2. A solution as in claim 1 in which R is the ethyl radical and in which $n$ is 1.

LESTER A. BROOKS.

REFERENCES CITED

The following references are of record in the file of this patent:

UNITED STATES PATENTS

| Number | Name | Date |
|---|---|---|
| 1,962,109 | Alvord | June 5, 1934 |
| 2,411,253 | Flenner et al. | Nov. 19, 1946 |